(12) United States Patent
Feng et al.

(10) Patent No.: US 11,216,282 B2
(45) Date of Patent: Jan. 4, 2022

(54) MULTI-DIE AND MULTI-CORE COMPUTING PLATFORM AND BOOTING METHOD FOR THE SAME

(71) Applicant: Shanghai Zhaoxin Semiconductor Co., Ltd., Shanghai (CN)

(72) Inventors: Qunchao Feng, Beijing (CN); Yankui Niu, Beijing (CN); Jinglong Liu, Beijing (CN); Yongfeng Song, Beijing (CN); Jiangbo Wang, Beijing (CN); Jintao Wang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 22 days.

(21) Appl. No.: 16/923,244

(22) Filed: Jul. 8, 2020

(65) Prior Publication Data

US 2021/0109762 A1     Apr. 15, 2021

(30) Foreign Application Priority Data

Oct. 15, 2019   (CN) .......................... 201910976671.4

(51) Int. Cl.
*G06F 9/4401* (2018.01)
*G06F 13/362* (2006.01)

(52) U.S. Cl.
CPC .......... *G06F 9/4406* (2013.01); *G06F 13/362* (2013.01)

(58) Field of Classification Search
CPC .............................. G06F 9/4406; G06F 13/362

USPC .............................................................. 713/2
See application file for complete search history.

(56) References Cited

U.S. PATENT DOCUMENTS

| 4,779,092 A * | 10/1988 | Takao ................... H04L 12/417 340/9.12 |
| 10,997,298 B2 * | 5/2021 | Asano ................... H04L 9/0822 |
| 2011/0270417 A1 * | 11/2011 | Araki .................. G05B 19/0421 700/3 |
| 2012/0079287 A1 * | 3/2012 | Leclercq ............... G06F 21/575 713/192 |
| 2013/0182706 A1 * | 7/2013 | Angst .................. H04L 12/185 370/390 |
| 2016/0242057 A1 * | 8/2016 | Ripley ............. H04L 12/40032 |
| 2018/0095740 A1 * | 4/2018 | Kotary ...................... G06F 8/60 |
| 2020/0326954 A1 * | 10/2020 | Feng ..................... G06F 9/4403 |

* cited by examiner

*Primary Examiner* — Paul R. Myers
(74) *Attorney, Agent, or Firm* — McClure, Qualey & Rodack, LLP

(57) ABSTRACT

A booting technology for a multi-die and multi-core computing platform is shown. A storage device stores number 1 firmware code and number 0 firmware code. A master die is coupled to the storage device through a bus and accesses the number 1 firmware code from the storage device through the bus. A first slave die is also coupled to the storage device through the bus. However, instead of accessing the storage device for the number 1 firmware code, the first slave die monitors the bus and retrieves the number 1 firmware code, accessed by the master die, from the bus. The master die further accesses the number 0 firmware code from the storage device through the bus. The master die executes the number 0 firmware code to operate the master die and the first slave die to boot the system and start up the platform.

20 Claims, 8 Drawing Sheets

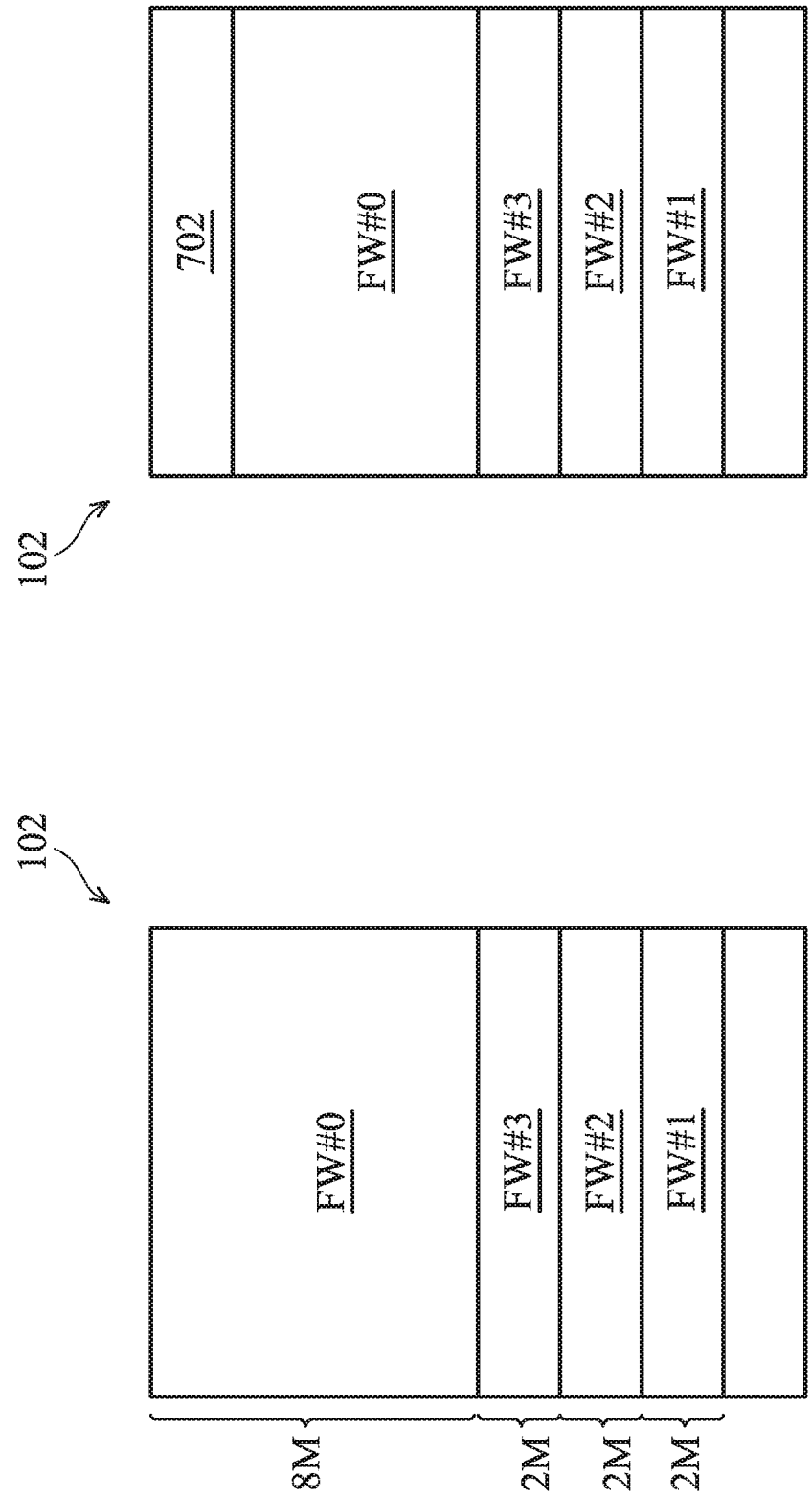

MULTI-DIE AND MULTI-CORE COMPUTING PLATFORM AND BOOTING METHOD FOR THE SAME

CROSS REFERENCE TO RELATED APPLICATIONS

This Application also claims priority of China Patent Application No. 201910976671.4, filed on Oct. 15, 2019, the entirety of which is incorporated by reference herein.

BACKGROUND OF THE INVENTION

Field of the Invention

The present invention is related to multi-die and multi-core computing platforms.

Description of the Related Art

A computing platform may include a plurality of dies. Each die may be used to build one or more cores. The links between the different dies must be initialized for the master die to boot up the whole multi-die and multi-core computing platform. How to efficiently establish links between the dies is an important subject in this technical field.

BRIEF SUMMARY OF THE INVENTION

An exemplary embodiment of the present invention stores firmware codes of multiple dies in the same storage device. The firmware codes of the different dies are read out from the same storage device by a master die. The different dies share the same storage device for firmware code storage. Conventionally, several storage devices are required for the different dies to separately store firmware codes. By using the same storage device to store the firmware codes of the different dies, the cost of firmware code storage and the wiring complexity are considerably reduced. Specifically, slave dies get their firmware codes before a reset signal of the computing platform is asserted. Before the reset signal of the computing platform is asserted, the firmware codes of the slave dies are accessed from the storage device and the firmware codes transferred on the bus are detected and retrieved by the slave dies. The slave dies are coupled to the bus in a high impedance manner and so that the master die operating the bus is not affected by the slave dies monitoring the bus. The master die and the slave dies all successfully retrieve and execute their firmware codes to initialize the links between the dies. Through the initialized links, the master die boots up the whole multi-die and multi-core computing platform and loads an operating system to the multi-die and multi-core computing platform. The multi-die and multi-core computing platform runs.

A multi-die and multi-core computing platform in accordance with an exemplary embodiment of the present invention includes a storage device, a master die and a first slave die. The storage device stores a number 0 firmware code and a number 1 firmware code. The master die is coupled to the storage device through a bus and accesses the number 1 firmware code from the storage device through the bus. The first slave die is coupled to the storage device through the bus and monitors the bus to retrieve the number 1 firmware code, accessed by the master die, from the bus. The master die further accesses the number 0 firmware code from the storage device through the bus. The master die executes the number 0 firmware code to operate the master die and the first slave die to boot the system, by which the multi-die and multi-core computing platform boots up.

In an exemplary embodiment, the first slave die is coupled to the master die by a link. The first slave die and the master die execute the number 1 firmware code and the number 0 firmware code, respectively, to initialize the link. Through the initialized link, the master die executing the number 0 firmware code operates the first slave die to boot the system.

In an exemplary embodiment, the master die comprises a number 0 processing unit, a number 0 chipset, and a resource zone bus controller. The number 0 processing unit and the number 0 chipset are activated by a reset signal. The resource zone bus controller is coupled to the bus and is activated earlier than the reset signal to access the number 1 firmware code from the storage device through the bus.

In an exemplary embodiment, the number 0 chipset has a number 0 bus controller. The number 0 bus controller accesses the number 0 firmware code from the storage device through the bus to be executed by the number 0 processing unit.

In an exemplary embodiment, the first slave die includes a number 1 processing unit, a number 1 chipset, and a resource zone bus detector. The resource zone bus detector is coupled to the bus and is activated earlier than the number 1 processing unit and the number 1 chipset. The resource zone bus detector monitors the bus to retrieve the number 1 firmware code, accessed by the master die, from the bus.

In an exemplary embodiment, the resource zone bus detector includes a memory storing the number 1 firmware code retrieved from the bus. The number 1 chipset includes a number 1 bus controller. The number 1 bus controller accesses the number 1 firmware code from the memory to be executed by the number 1 processing unit.

In another exemplary embodiment, a method for booting a multi-die and multi-core computing platform is shown based on the aforementioned concepts.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 7A illustrates the allocation (in a fixed manner) of the storage device 102 in accordance with an exemplary embodiment of the present invention; and FIG. 7B illustrates the allocation of the storage device 102 in accordance with another exemplary embodiment of the present invention.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
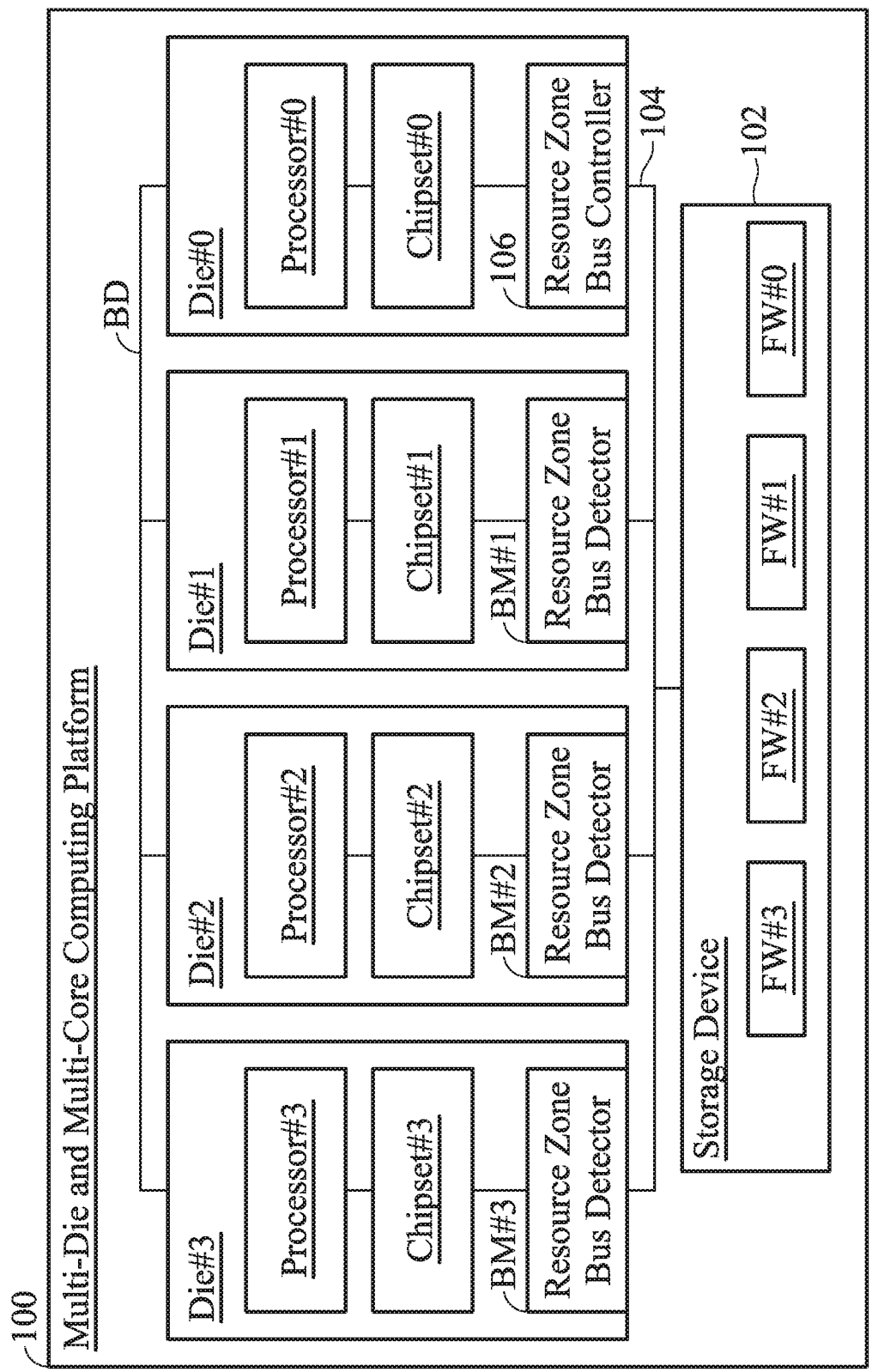
FIG. 1 illustrates a multi-die and multi-core computing platform 100 in accordance with an exemplary embodiment of the present invention.

FIG. 1 illustrates a multi-die and multi-core computing platform 100 in accordance with an exemplary embodiment of the present invention, which includes four dies Die #3, Die #2, Die #1 and Die #0. Each die provides at least one core. For example: Die #3 provides a processing unit Processor #3 and a chipset Chipset #3; Die #2 provides a processing unit Processor #2 and a chipset Chipset #2; Die #1 provides a processing unit Processor #1 and a chipset Chipset #1; and Die #0 provides a processing unit Processor #0 and a chipset Chipset #0. The dies Die #3~Die #0 correspond to the firmware codes FW #3~FW #0, respectively. The firmware codes FW #3~FW #0 are stored in the same storage device 102. Compared with using multiple storage devices to separate the firmware codes of the different dies, using the same storage device to store firmware codes of the several dies greatly reduces the storage cost of firmware code and reduces the wiring complexity.

As shown, a bus 104 for accessing the storage device 102 is coupled to all of the dies Die #3~Die #0. The firmware codes FW #3~FW #1 of the slave dies Die #3~Die #1 are read out from the storage device 102 through the bus 104 by a resource zone bus controller 106 of the master die Die #0. The slave dies Die #3~Die #1 use resource zone bus detectors BM #3~BM #1 to monitor the bus 104. The firmware codes FW #3~FW #1 transferred on the bus 104 are detected and retrieved by the resource zone bus detectors BM #3~BM #1 of the slave dies Die #3~Die #1. In an exemplary embodiment, the resource zone bus controller 106 has a random access memory (RAM). The resource zone bus controller 106 uses the random access memory to temporarily store the firmware codes FW #3~FW #1 accessed from the storage device 102 through the bus 104. The random access memory temporarily storing firmware codes FW #3~FW #1 does not need to be large. In another exemplary embodiment, the resource zone bus controller 106 does not need to temporarily store the firmware codes FW #3~FW #1 accessed from the storage device 102 through the bus 104. When being read out by the resource zone bus controller 106 and transferred through the bus 104, the firmware codes FW #3~FW #1 are detected and retrieved by the corresponding one of the resource region bus detectors BM #3~BM #1. The resource zone bus detectors BM #3~BM #1 coupled to the bus 104 have high impedance (e.g., using an oscilloscope technology). The detection and retrieving actions of the resource zone bus detectors BM #3~BM #1, therefore, do not disturb the bus 104. The resource zone bus controller 106 using the bus 104 is not affected. When detecting a matched die address from the transferred firmware code, the resource zone bus detector BM #3/BM #2/BM #1 retrieves the transferred firmware code from the bus 104. After accessing all firmware codes FW3 to FW1 from the storage device 102, the resource zone bus controller 106 outputs an enable signal BD to the slave dies Die #3~Die #1 to acknowledge that the firmware codes FW #3~FW #1 are ready. Based on the enable signal BD and a reset signal RST (not shown, e.g., a PCI reset signal) of the multi-die and multi-core computing platform 100, the processing units Processor #3~Processor #1 and the chipsets Chipset #3~Chipset #1 in the slave dies Die #3~Die #1 are activated to run the firmware codes FW #3~FW #1 for initialization of the links between the dies. Meanwhile, the processing unit Processor #0 and the chipset Chipset #0 within the master die Die #0 activated by the reset signal RST of the platform 100 accesses the firmware code FW #0 from the storage device 102. Through the initialized links, the master die Die #0 executing the firmware code FW #0 operates the slave dies Die #3~Die #1 to boot the system, and the computing platform 100 boots up.

The dies of the multi-die and multi-core computing platform 100 may not include chipsets, and the total number of dies is not limited to 4. FIG. 1 shows three slave dies Die #3~Die #1 as an example, but the present invention is not limited thereto. In summary, the multi-die and multi-core computing platform 100 of the present invention may share a storage device 102 to store firmware codes of multiple dies. The master die Die #0 and the slave dies Die #3~Die #1 all are coupled to the storage device 102 by the bus 104. The master die Die #0 accesses the firmware codes FW #3~FW #1 of the slave dies Die #3~Die #1 from the storage device 102 through the bus 104. The slave dies Die #3~Die #1 monitor the bus 104 to retrieve the firmware codes FW #3~FW #1, respectively, from the bus 104. The master die Die #0 further accesses firmware code FW #0 from the storage device 102 through the bus 104. The master die Die #0 executes the firmware code FW #0 to operate the dies of the multi-die and multi-core computing platform 100 to boot the system.

The present invention specifically involves the concept of resource zones. The components that are activated when the power plug of the computing platform is plugged in are resource zone components. In contrast, the components that are activated by pressing a power button of the computing platform or by the resetting of the operating system (which pulls up the reset signal RST, such as a PCI reset) are core zone components. For example, the processing units Processor #3~Processor #0 and the chipsets Chipset #3~Chipset #0 of the dies Die #3~Die #0 are core zone components. Because of the design of the resource zone bus controller 106 and the resource zone bus detectors BM #3~BM #1, the slave dies Die #3~Die #1 get their firmware codes FW #3~FW #1 prior to the core zone operations. Later, the components of the core zone (for example, the processing units Processor #3~Processor #0 and the chipsets Chipset #3~Chipset #0 within the dies Die #3~Die #0) are activated and, based on the firmware codes loaded at the earlier time, the core zone components instantly complete the link initialization and boot the computing platform.

Figure 2A:
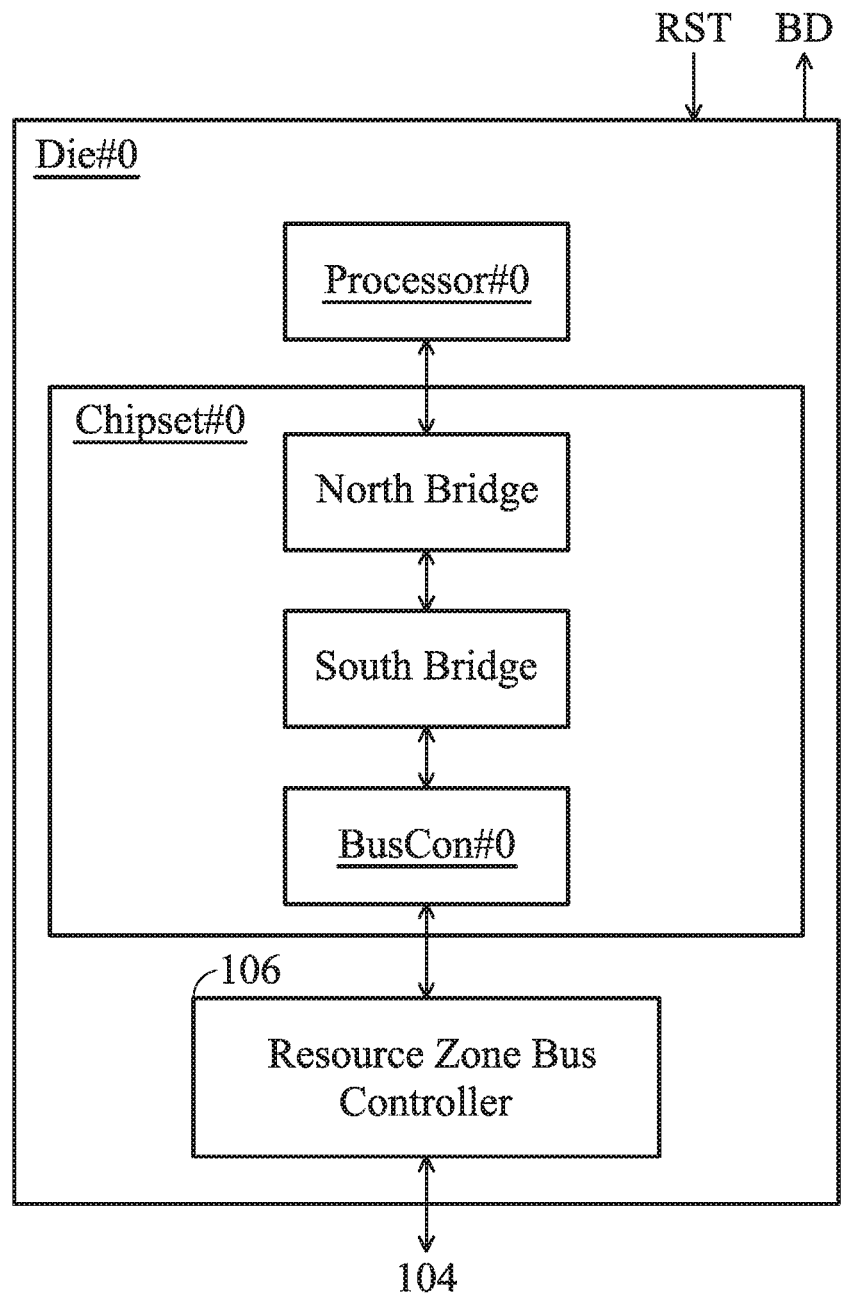
FIG. 2A shows the architecture of the master die Die #0.

FIG. 2A shows the architecture of the master die Die #0. The processing unit Processor #0 and the chipset Chipset #0 are core zone components. The resource zone bus controller 106 is a resource zone component, which is different from a bus controller BusCon #0 (which is a core zone component) provided within the chipset Chipset #0. The resource zone bus controller 106 is activated prior to the reset signal RST that activates the core zone components. For example, the resource zone bus controller 106 may be activated when the power plug of the computing platform 100 is plugged in and the power signal VSUS is pulled up. The resource zone bus controller 106 accesses the firmware codes FW #3~FW #1 from the storage device 102 through the bus 104, so that the firmware codes FW #3~FW #1 are transferred on the bus 104. The slave dies Die #3~Die #1 monitor the bus 104 and retrieves the firmware codes FW #3~FW #1, respectively. After accessing the firmware codes FW #3~FW #1 from the storage device 102, the resource zone bus controller 106 may output an enable signal BD. The core of the master die Die #0 may be activated by the reset signal RST of the multi-die and multi-core computing platform 100 (e.g., by pressing the power button or by the reset of the operating system).

Figure 2B:
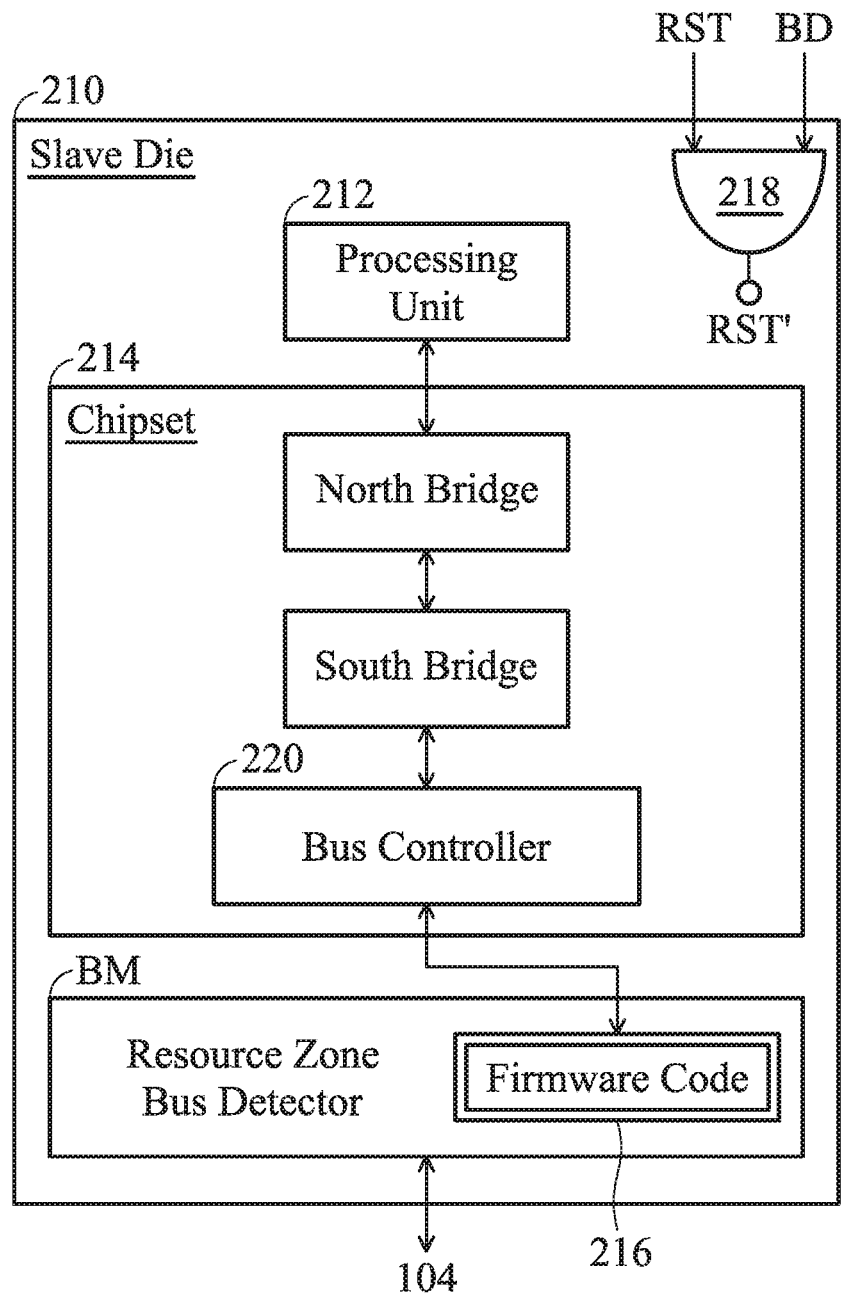
FIG. 2B depicts an architecture of a slave die 210 (e.g., the dies Die #3~Die #1) in accordance with an exemplary embodiment of the present invention.

FIG. 2B depicts an architecture of a slave die 210 (e.g., the dies Die #3~Die #1) in accordance with an exemplary embodiment of the present invention. The processing unit 212 and chipset 214 are core zone components. The resource zone bus detector BM is a resource zone component and includes a memory 216 (e.g., an SRAM). The resource zone bus detector BM is activated prior to the reset signal RST of the multi-die and multi-core computing platform 100. For example, when the power plug of the computing platform 100 is plugged in, the power signal VSUS is pulled up and, accordingly, the resource zone bus detector BM runs. The resource zone bus detector BM monitors the bus 104, identifies and retrieves the firmware code having the matched die address from the bus 104, and stores the retrieved firmware code in the memory 216. As shown, the slave die 210 has a logic AND gate 218. Based on the reset signal RST of the multi-die and multi-core computing platform 100 (wherein the reset signal RST is activated by pressing the power button or by the reset of the operating system) and an enable signal BD from the master die Die #0 (wherein the enable signal BD is activated after the resource zone bus controller 106 completes the access of the firmware codes FW #3~FW #1), the logic AND gate 218 generates a reset signal RST' for the slave die 210. The bus controller 220 of the core zone chipset 214 is activated by the reset signal RST' to access the firmware code of the slave die 210 from the memory 216, and the accessed firmware code is executed by the processing unit 212 that is activated by the reset signal RST'. The master die Die #0 may transfer the enable signal BD to the slave dies Die #3~Die #1 through a sideband channel, e.g., a general purpose input/output pin (GPIO) of each die, prior to the initialization of the links between the dies.

As shown, the bus controller 220 of the slave die 210 (Die #3/Die #2/Die #1) does not access the storage device 102 through the bus 104 for firmware code accessing. Instead, the bus controller 220 read the pre-fetched firmware code (FW #3/FW #2/FW #1) from the memory 216. The hardware device of the slave die 210 (Die #3/Die #2/DW #1) is quite different from a conventional design. Conventionally, after the core zone components are activated, a north bridge outputs a read command (e.g., ROMSIP) to drive a bus controller to access the corresponding firmware code from a storage device through a bus. In this exemplary embodiment, the read command output by the north bridge is transformed into a read request for the memory 216. The memory 216, therefore, imitates the storage device 102 and returns the pre-fetched firmware code to bus controller 220. The die 210 may regard the pre-fetched firmware code (FW #3/FW #2/FW #1) as the firmware code (FW #3/FW #2/FW #1) accessed from the memory 102 through the bus 104, to respond to the read command (e.g., ROMSIP) from the north bridge.

When the processing unit 212 of the slave die 210 (Die #3/Die #2/Die #1) executes its own firmware code (read from the memory 216) to prepare for initialization of the links between the dies, almost simultaneously, the core zone bus controller BusCon #0 of the master die Die #0 bypasses the resource zone bus controller 106 to access the firmware code FW #0 from the storage device 102 through the bus 104 and the processing unit Processor #0 executes the firmware code FW #0 to get ready to initialize the links between the dies. Based on the initial setting on the dies Die #3~Die #0, the link initialization is completed quickly. The rest of the firmware code FW #0 is further executed on the master die Die #0 to realize the system booting on the master die Die #0. Through the initialized links between the dies, the master die Die #0 executing the firmware code FW #0 further realizes the system booting on the slave dies Die #3~Die #1.

Figure 3:
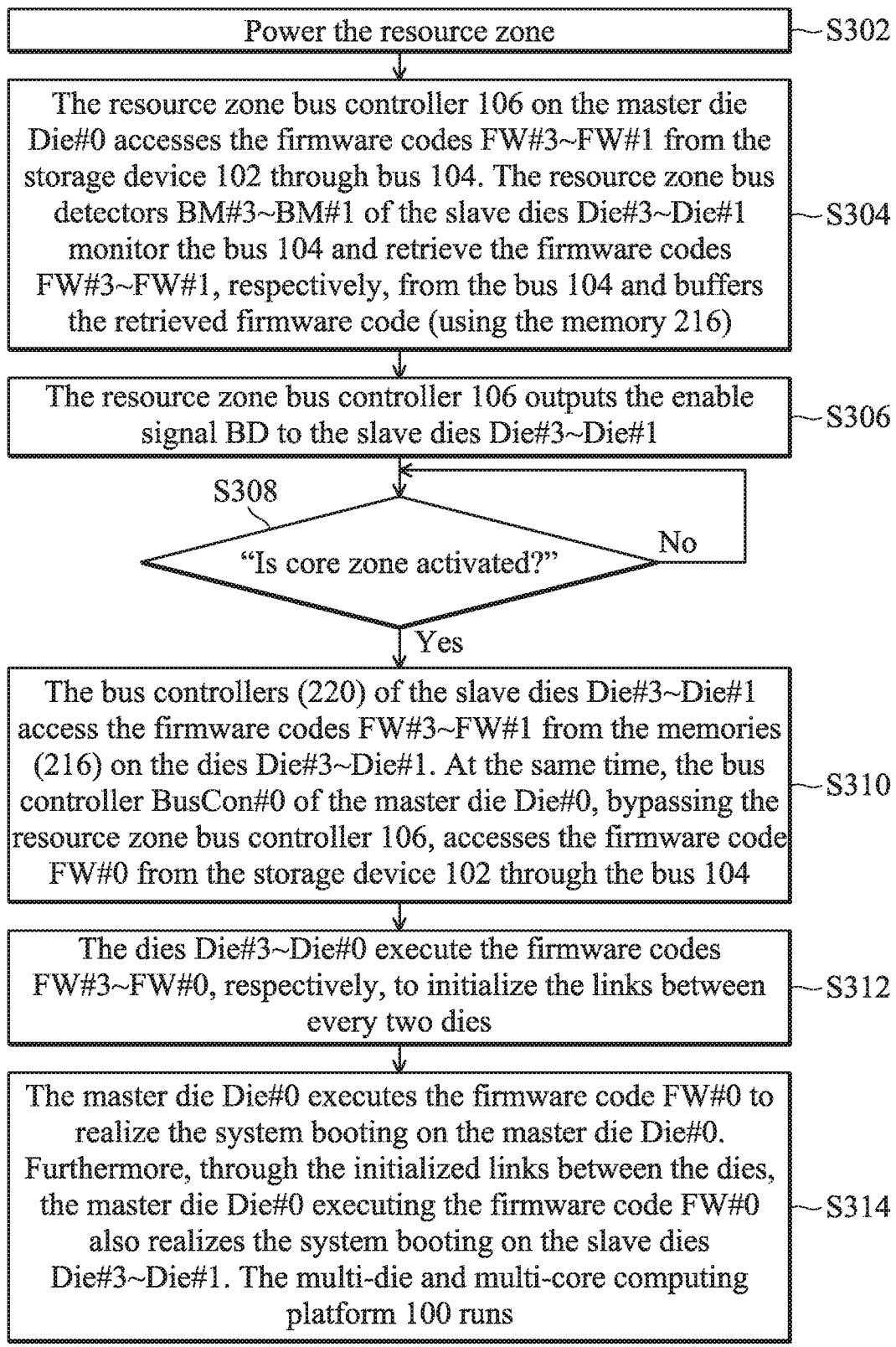
FIG. 3 is a flow chart illustrating the operational concept of the multi-die and multi-core computer platform 100 in accordance with an exemplary embodiment of the present invention.

FIG. 3 is a flow chart illustrating the operational concept of the multi-die and multi-core computer platform 100 in accordance with an exemplary embodiment of the present invention.

In step S302, the resource zone is powered. For example, a power signal VSUS of a multi-die and multi-core computer platform 100 is pulled up in step S302 by the plug-in of a power plug of the computing platform 100.

In step S304, the resource zone bus controller 106 on the master die Die #0 accesses the firmware codes FW #3~FW #1 from the storage device 102 through bus 104. The resource zone bus detectors BM #3~BM #1 of the slave dies Die #3~Die #1 monitor the bus 104 and retrieve the firmware codes FW #3~FW #1, respectively, from the bus 104 (using oscilloscope technology) and buffers the retrieved firmware code (using the memory 216).

In step S306, the resource zone bus controller 106 outputs the enable signal BD to the slave dies Die #3~Die #1.

Step S308 checks whether the core zone of the multi-die and multi-core computing platform 100 is activated. In an exemplary embodiment, the reset signal RST of the multi-die and multi-core computing platform 100 is pulled up by pressing the power button (to power on or reset the multi-die and multi-core computing platform 100) or is pulled up by the reset of the operating system. The core zone of the master die Die #0 is activated by the reset signal RST. The core zone components of the slave dies Die #3~Die #1 are activated according to the reset signal RST and the enable signal BD.

In step S310, the bus controllers (220) of the slave dies Die #3~Die #1 access the firmware codes FW #3~FW #1 from the memories (216) on the dies Die #3~Die #1. At the same time, the bus controller BusCon #0 of the master die Die #0, bypassing the resource zone bus controller 106, accesses the firmware code FW #0 from the storage device 102 through the bus 104.

In step S312, the dies Die #3~Die #0 execute the firmware codes FW #3~FW #0, respectively, to initialize the links between every two dies.

In step S314, the master die Die #0 executes the firmware code FW #0 to realize the system booting on the master die Die #0. Furthermore, through the initialized links between the dies, the master die Die #0 executing the firmware code FW #0 also realizes the system booting on the slave dies Die #3~Die #1. The multi-die and multi-core computing platform 100 runs.

Figure 4:
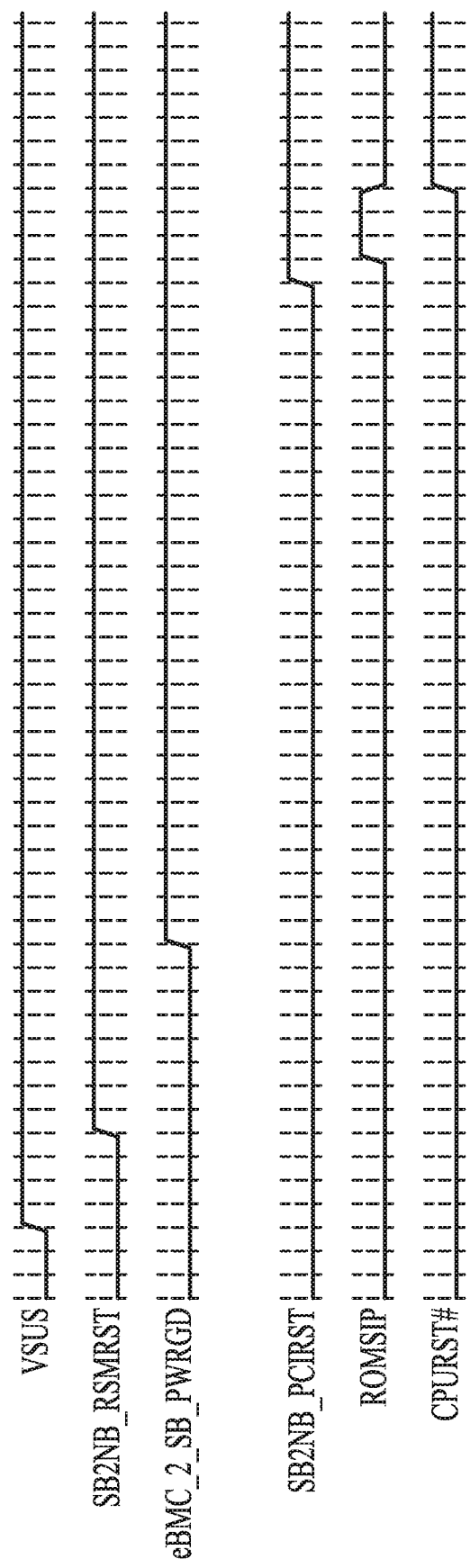
FIG. 4 is a timing diagram illustrating the booting procedure of the multi-die and multi-core computing platform 100.

FIG. 4 is a timing diagram illustrating the booting procedure of the multi-die and multi-core computing platform 100. When the power VSUS is turned on, the resource zone components are powered and a signal SB2NB_RSMRST is pulled up. According to the asserted signal SB2NB_RSMRST, the resource zone bus controller 106 accesses the firmware codes FW #3~FW #1 from the storage device 102 through the bus 104, and the resource zone bus detectors BM #3~BM #1 monitor the contents transferred through the bus 104 to retrieve the firmware codes FW

3~FW #1 from the bus 104, respectively. The resource zone bus detectors BM #3~BM #1 stores the retrieved firmware codes FW #3~FW #1 into the memory (216). After reading the firmware codes FW #3~FW #1, the signal eBMC_2_SB_PWRGD is pulled up by the resource zone bus controller 106. According to the signal eBMC_2_SB_PWRGD, and the bus controller BusCon #0 of the master die Die #0 bypasses the resource zone bus controller 106 to access the firmware code FW #0 from the storage device 102 through bus 104.

The resource zone bus controller 106 outputs an enable signal BD when it completes its accessing of the firmware code FW #3~FW #1 from the storage device 102 through the bus 104. According to the enable signal BD, each of the slave dies Die #3~Die #1 pulls up a signal SB2NB_PCIRST (e.g., the reset signal RST'). The cores of the slave dies Die #3~Die #1 run. Within each of the slave dies Die #3~Die #1, the north bridge outputs a read request ROMSIP and, accordingly, the bus controller 220 accesses the corresponding firmware code from the memory 216. According to a signal CPURST # issued by the north bridge, the processing unit 212 is activated to execute the firmware code accessed from the memory 216.

As shown, the master die Die #0 and the slave dies Die #3~Die #1 execute firmware codes in parallel.

Figure 5:
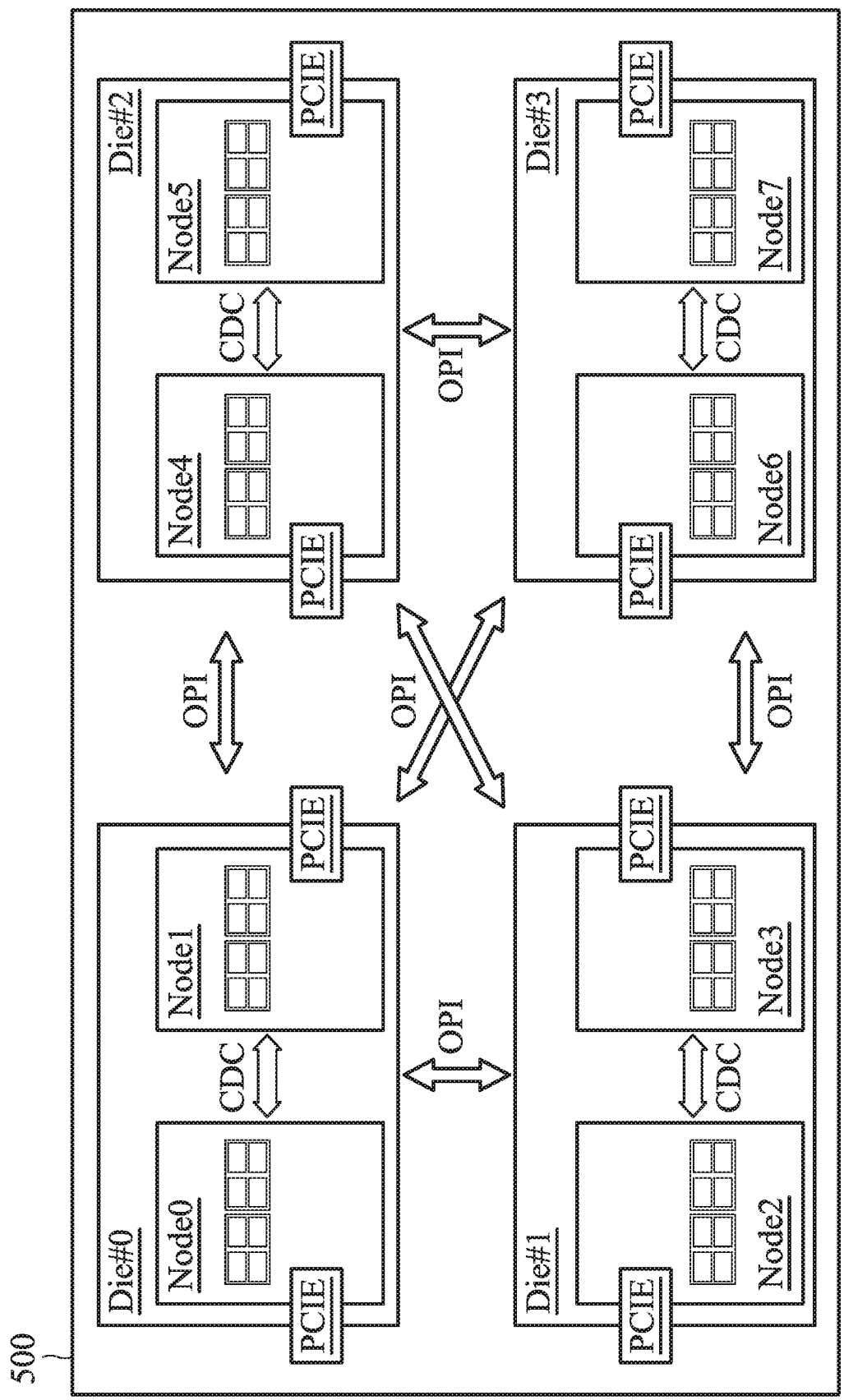
FIG. 5 illustrates a socket board 500.

FIG. 5 illustrates a socket board 500. Each die may provide multiple computing cores. Each computing core is labeled with a node number Node # and has a high-speed serial computer expansion bus PCIE. With the techniques disclosed in the foregoing embodiments, each die with loaded firmware code initializes the links (e.g., OPI) to other dies and initializes the links (e.g., CDC) between all computing cores on the same die. Benefiting from the booting design of the present invention, the initialization of the CDC links is also fast and simple.

Figure 6:
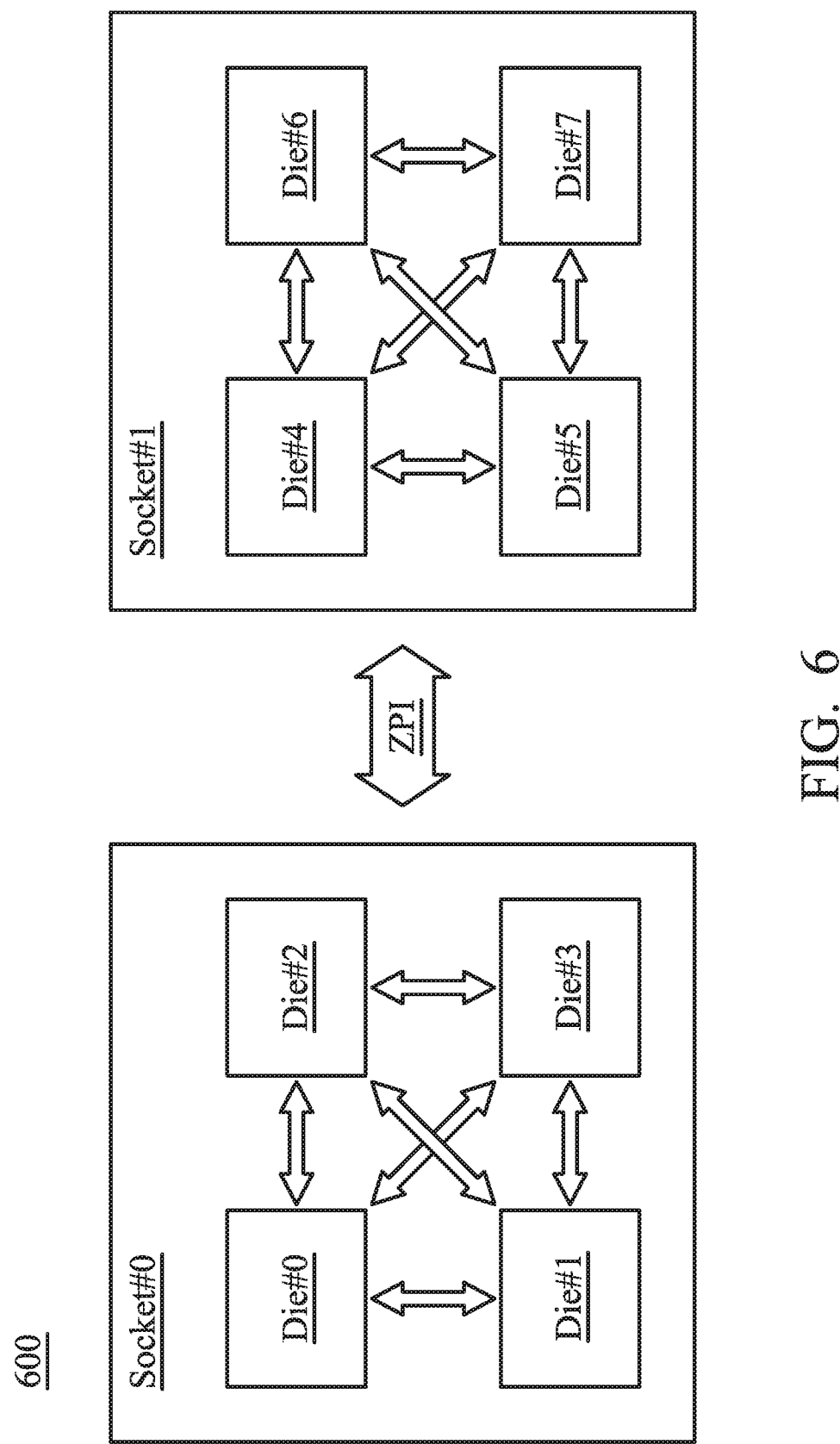
FIG. 6 illustrates a multi-die and multi-core computing platform 600 that is formed by two socket boards Socket #0 and Socket #1.

FIG. 6 illustrates a multi-die and multi-core computing platform 600 that is formed by two socket boards Socket #0 and Socket #1.

The two socket boards Socket #0 and Socket #1 may share one storage device to store the firmware codes. As shown, there are slave dies Die #7~Die #1 and one master die Die #0. Based on the techniques of the foregoing embodiments, the master die Die #0 accesses the firmware codes FW #7~FW #1 from the storage device 102 through the bus 104. The slave dies Die #7~Die #1 monitor the bus 104 to retrieve the firmware codes FW #7~FW #1 from the bus 104, respectively. After accessing the firmware codes FW #7~FW #1, the master die Die #0 accesses the firmware code FW #0 from the storage device 102 through the bus 104. The slave dies Die #7~Die #1 and the master die Diei #0 execute firmware codes to initialize the OPI links between the dies Die #7~Die #0 and initialize the ZPI link between the socket boards Socket #0 and Socket #1. Through the initialized links, the master die Die #0 executing the firmware code FW #0 operates the dies to boot the system. The multi-die computing platform 100 runs.

FIG. 7A illustrates the allocation (in a fixed manner) of the storage device 102 in accordance with an exemplary embodiment of the present invention. The storage space of the storage device 102 is 16M in total. The first 8M stores the firmware code FW #0 of the master die Die #0. The following 6M is divided into three segments (2M each), fixed for the firmware codes FW #3~FW #1.

FIG. 7B illustrates the allocation of the storage device 102 in accordance with another exemplary embodiment of the present invention. The addresses of the firmware codes FW #3~FW #0 are recorded in the field 702. A more flexible allocation is shown.

Specifically, the forgoing link initialization is due to the need for link training, which is required to determine the data rate and the bandwidth prior to establishing the links (e.g., OPI or ZPI) between the dies. By the execution of firmware codes, physical layer hardware is set and triggered to perform the link training. The hardware writes the training result to the registers for the further execution of the firmware codes. In the slave dies, the firmware codes are executed for the link initialization. In the master die, the firmware code is not only executed for the link initialization. The firmware code of the master die is also responsible for the system booting of the entire platform. The firmware code of the master die also loads the operating system to the master die.

Without using an arbitration circuit, a storage device is shared by multiple dies to storage the firmware codes of the different dies.

The enable signal BD may be transferred from the master die Die #0 to the slave dies Die #3~Die #1 through general input and output pins (GPIOs).

The foregoing technology may also be used to implement booting method for a multi-die and multi-core computing platform.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-die and multi-core computing platform, comprising:
   a storage device, storing a number 0 firmware code and a number 1 firmware code;
   a master die, coupled to the storage device through a bus, accesses the number 1 firmware code from the storage device through the bus; and
   a first slave die, coupled to the storage device through the bus, monitors the bus to retrieve the number 1 firmware code, accessed by the master die, from the bus,
   wherein:
   the master die further accesses the number 0 firmware code from the storage device through the bus; and
   the master die executes the number 0 firmware code to operate the master die and the first slave die to boot a system, by which the multi-die and multi-core computing platform boots up.

2. The multi-die and multi-core computing platform as claimed in claim 1, wherein:
   the first slave die is coupled to the master die by a link;
   the first slave die and the master die execute the number 1 firmware code and the number 0 firmware code, respectively, to initialize the link; and
   through the initialized link, the master die executing the number 0 firmware code operates the first slave die to boot the system.

3. The multi-die and multi-core computing platform as claimed in claim 1, wherein:
   the master die comprises a number 0 processing unit, a number 0 chipset, and a resource zone bus controller;

the number 0 processing unit and the number 0 chipset are activated by a reset signal; and the resource zone bus controller is coupled to the bus and is activated earlier than the reset signal to access the number 1 firmware code from the storage device through the bus.

4. The multi-die and multi-core computing platform as claimed in claim 3, wherein:

the number 0 chipset has a number 0 bus controller;

the number 0 bus controller accesses the number 0 firmware code from the storage device through the bus to be executed by the number 0 processing unit.

5. The multi-die and multi-core computing platform as claimed in claim 1, wherein:

the first slave die includes a number 1 processing unit, a number 1 chipset, and a resource zone bus detector;

the resource zone bus detector is coupled to the bus and is activated earlier than the number 1 processing unit and the number 1 chipset; and the resource zone bus detector monitors the bus to retrieve the number 1 firmware code, accessed by the master die, from the bus.

6. The multi-die and multi-core computing platform as claimed in claim 5, wherein:

the resource zone bus detector is coupled to the bus in a high impedance manner to prevent interference to the resource zone bus controller operating the bus.

7. The multi-die and multi-core computing platform as claimed in claim 5, wherein:

the resource zone bus detector includes a memory storing the number 1 firmware code retrieved from the bus;

the number 1 chipset includes a number 1 bus controller; and the number 1 bus controller accesses the number 1 firmware code from the memory to be executed by the number 1 processing unit.

8. The multi-die and multi-core computing platform as claimed in claim 5, wherein:

the master die outputs an enable signal to the first slave die after access of the number 1 firmware code is completed; and the first slave die includes a logic AND gate that receives a reset signal and the enable signal, and the number 1 processing unit and the number 1 chipset are activated by an output of the logic AND gate.

9. The multi-die and multi-core computing platform as claimed in claim 1, further comprising:

a second slave die, coupled to the storage device through the bus; and a third slave die, coupled to the storage device through the bus, wherein:

the storage device further stores a number 2 firmware code and a number 3 firmware code;

the master die further accesses the number 2 firmware code and the number 3 firmware code from the storage device through the bus;

the second slave die monitors the bus to retrieve the number 2 firmware code, accessed by the master die, from the bus; and the third slave die monitors the bus to retrieve the number 3 firmware code, accessed by the master die, from the bus.

10. The multi-die and multi-core computing platform as claimed in claim 9, wherein:

the third slave die, the second slave die, the first slave die and the master die execute the number 3 firmware code, the number 2 firmware code, the number 1 firmware code, and the number 0 firmware code, respectively, to initialize links between every two dies of the third slave die, the second slave die, the first slave die, and the master die; and through the initialized inks, the master die executing the number 0 firmware code operates the first slave die, the second slave die, and the third slave die to boot the system.

11. The multi-die and multi-core computing platform as claimed in claim 9, further comprising:

a first socket board with the master die, the first slave die, the second slave die, and the third slave die; and a second socket board with a fourth slave die, a fifth slave die, a sixth slave die and a seventh slave die, which are coupled to the storage device through the bus, wherein:

the storage device further stores a number 4 firmware code, a number 5 firmware code, a number 6 firmware code, and a number 7 firmware code;

the master die further accesses the number 4 firmware code, the number 5 firmware code, the number 6 firmware code, and the number 7 firmware code from the storage device through the bus;

the fourth slave die monitors the bus to retrieve the number 4 firmware code, accessed by the master die, from the bus;

the fifth slave die monitors the bus to retrieve the number 5 firmware code, accessed by the master die, from the bus;

the sixth slave die monitors the bus to retrieve the number 6 firmware code, accessed by the master die, from the bus; and the seventh slave die monitors the bus to retrieve the number 7 firmware code, accessed by the master die, from the bus.

12. The multi-die and multi-core computing platform as claimed in claim 11, further comprising:

the seventh slave die, the sixth slave die, the fifth slave die, the fourth slave die, the third slave die, the second slave die, the first slave die and the master die execute the number 7 firmware code, the number 6 firmware code, the number 5 firmware code, the number 4 firmware code, the number 3 firmware code, the number 2 firmware code, the number 1 firmware code, and the number 0 firmware code, respectively, to initialize links between every two dies of the seventh slave die, the sixth slave die, the fifth slave die and the fourth slave die and links between every two dies of the third slave die, the second slave die, the first slave die and the master die, and to further initialize a link between the first socket board and the second socket board; and through the initialized links, the master die executing the number 0 firmware code operates the first slave die, the second slave die, the third slave die, the fourth slave die, the fifth slave die, the sixth slave die, and the seventh slave die to boot the system.

13. A method for booting a multi-die and multi-core computing platform, comprising:

driving a master die to access a number 1 firmware code from a storage device through a bus;

driving a first slave die to monitor the bus to retrieve the number 1 firmware code, accessed by the master die, from the bus;

driving the master die to further access a number 0 firmware code from the storage device through the bus; and driving the master die to execute the number 0 firmware code to operate the master die and the first slave die to boot the system, by which the multi-die and multi-core computing platform boots up.

14. The method as claimed in claim 13, wherein:

the first slave die and the master die execute the number 1 firmware code and the number 0 firmware code, respectively, to initialize a link between the first slave die and the master die; and through the initialized link, the master die executing the number 0 firmware code operates the first slave die to boot the system.

15. The method as claimed in claim 13, wherein:

the master die comprises a resource zone bus controller;

the resource zone bus controller is coupled to the bus and is activated earlier than a reset signal to access the number 1 firmware code from the storage device through the bus; and a number 0 processing unit and a number 0 chipset of the master die are activated by the reset signal.

16. The method as claimed in claim 15, wherein:

the number 0 chipset includes a number 0 bus controller; and the number 0 bus controller accesses the number 0 firmware code from the storage device through the bus.

17. The method as claimed in claim 13, wherein:

the first slave die comprises a resource zone bus detector; and the resource zone bus detector is coupled to the bus and activated earlier than a number 1 processing unit and a number 1 chipset of the first slave die;

the resource zone bus detector monitors the bus and retrieves the number 1 firmware code, accessed by the master die, from the bus.

18. The method as claimed in claim 17, wherein:

the resource zone bus detector is coupled to the bus in a high impedance manner to prevent interference to the resource zone bus controller operating the bus.

19. The method as claimed in claim 17, wherein:

the resource zone bus detector includes a memory storing the number 1 firmware code retrieved from the bus;

the number 1 chipset includes a number 1 bus controller; and the number 1 bus controller accesses the number 1 firmware code from the memory to be executed by the number 1 processing unit.

20. The method as claimed in claim 17, wherein:

the master die outputs an enable signal to the first slave die when access of the number 1 firmware code is completed; and the first slave die includes a logic AND gate that receives a reset signal and the enable signal, and the number 1 processing unit and the number 1 chipset are activate by an output of logic AND gate.

* * * * *